(No Model.) 2 Sheets—Sheet 2.
J. DAVID.
PROPELLER FOR SHIPS, &c.
No. 289,994. Patented Dec. 11, 1883.
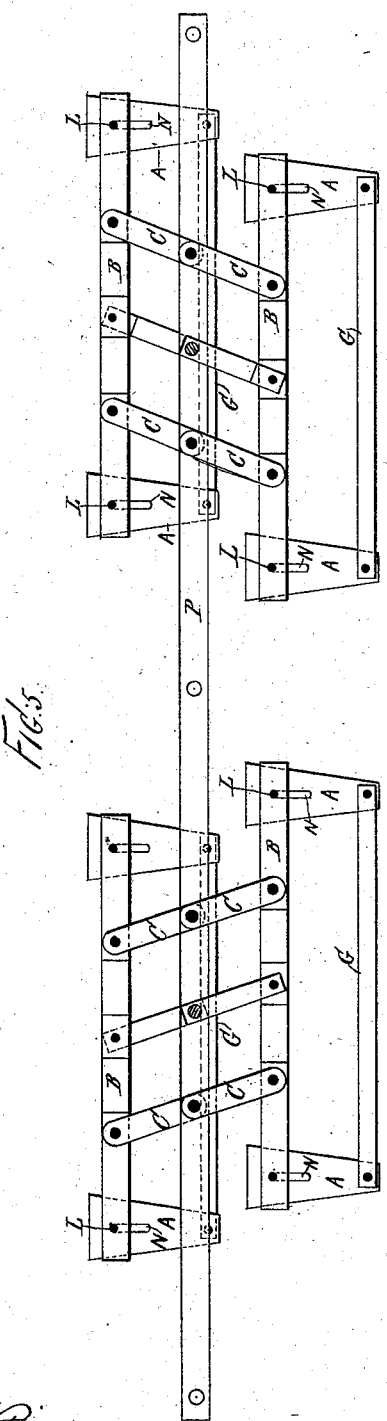
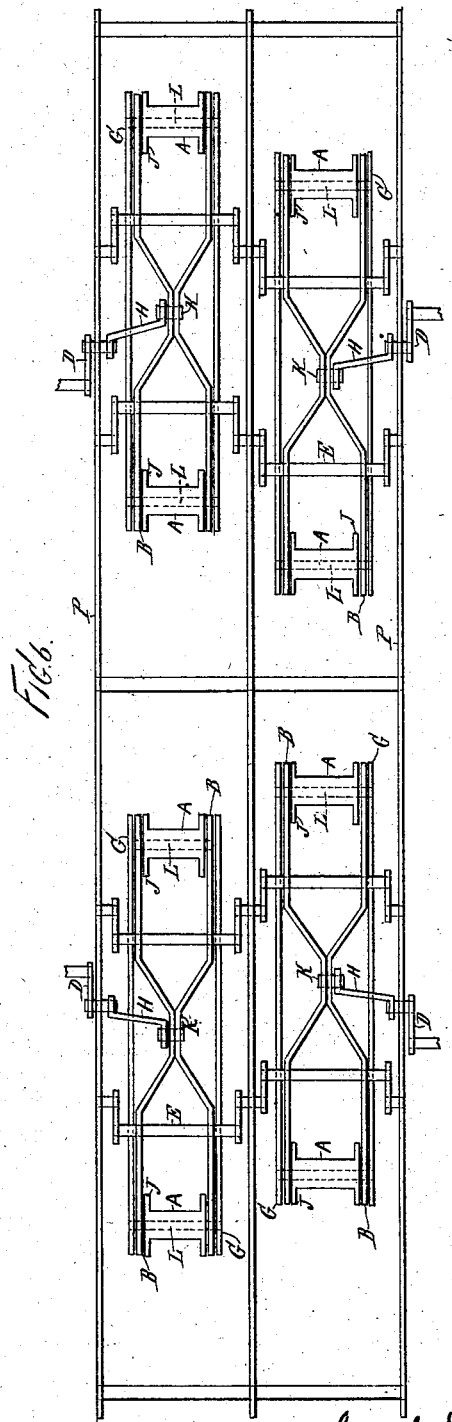
Witnesses:
John Buckler
Worth Osgood
Jacob David
Inventor.
By W C Wren
Attorney.

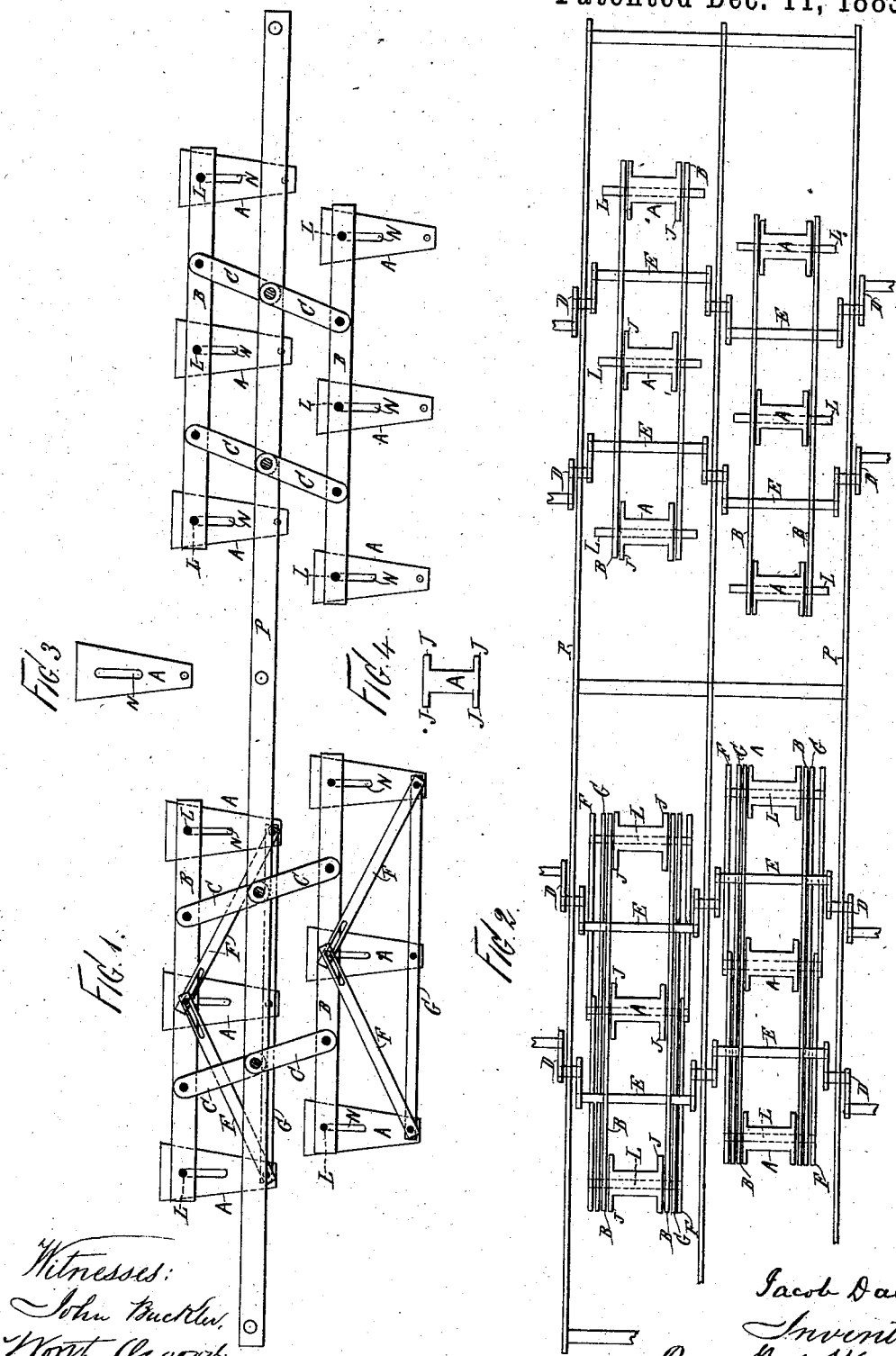

UNITED STATES PATENT OFFICE.

JACOB DAVID, OF BROOKLYN, NEW YORK, ASSIGNOR OF ONE-HALF TO EDWARD A. DEVEAU, OF SAME PLACE.

PROPELLER FOR SHIPS, &c.

SPECIFICATION forming part of Letters Patent No. 289,994, dated December 11, 1883.

Application filed May 10, 1883. (No model.)

*To all whom it may concern:*

Be it known that I, JACOB DAVID, a citizen of the United States, residing at Brooklyn, in the county of Kings and State of New York, have invented a new and useful Propeller for Vessels, of which the following is a specification.

My invention relates to improvements in propellers or paddles, in which vertical or perpendicular buckets or blades operate in conjunction with cranks, crank-bars, and connecting-bars, by means of which the buckets or blades are always maintained in a vertical or perpendicular position in or out of the water, and the points of the blades or buckets made to describe a segment of a circle on entering and leaving the water. I attain these objects by the mechanism shown in the accompanying drawings, in which—

Figure 1 is an elevation, having the outside frame, P, removed. Fig. 2 is a top plan view. Fig. 3 is an elevation of one blade or bucket. Fig. 4 is a cross-section of one blade or bucket. Fig. 5 is an elevation, outside frame removed; Fig. 6, a top plan view.

The buckets or blades (marked A) have a slot, N, that passes entirely through from side to side, as shown at Figs. 1, 3, and 5, through which slot a bolt or shaft, L, passes to sustain the blades in their places on the connecting-bars B, as shown at Figs. 1, 2, 5, and 6. The buckets or blades A have sides projecting toward front and back, (marked J,) giving them the form shown at Figs. 3 and 4. The dotted lines shown at Figs. 2 and 6 (marked L) show the bolts or shafts L, through the slots N in the buckets A, sustaining the buckets A to the connecting-bars B. The parts marked C are crank-arms, that are affixed to all the cranks marked D by short shafts having journals on them, that pass through the frame P, as shown at Figs. 1, 2, 5, 6; and the crank-arms C are connected together in pairs by the shafts marked E, which shafts pass through and sustain the horizontal bars B and blades or buckets A, as shown at Figs. 1, 2, 5, 6. In Figs. 1 and 2 I call each three buckets connected together a "series," and each six buckets connected together by the same cranks and arms a "section," having four series and two sections, and in Figs. 5 and 6 each pair are a series, and each two pair a section having four series and two sections. Each series of buckets have pivoted to the lower ends, on both sides, and connecting them together, a bar marked G, as shown at the left-hand sections of Figs. 1, 2, 5, 6, and each series of buckets have also pivoted to the lower ends of the outside buckets one end of bars marked F, which bars F have on the other end a slot, and are attached to the bolt L, as shown at Figs. 1 and 2. By means of the bars G and F the buckets A are held vertically, and by means of the bars marked F, with the slot in them, the buckets can be raised or lowered above or below the bar B and fastened in position. Each section, as shown at Fig. 2, has two cranks (marked D) on each side of each section, and to move the paddles each pair of cranks on each side of each section must be coupled together and connected with a suitable motive power.

Figs. 1 and 2 show six buckets in each section with four cranks, and Figs. 5 and 6 show four buckets to a section and two cranks, one on each side. At Figs. 1 and 2 the cranks are attached to the arms C, while at Figs. 5 and 6 the cranks are attached to arms H, which arms H are connected to the bars B by a journal, K, as shown. With the device shown at Figs. 1 and 2, or with the device shown at Figs. 5 and 6, the result is the same. The crank or cranks of each series of blades are to be set so as not to cause any two series to be on the same center at the same time. When the cranks are turned by a suitable motive power, the crank-arms C or H revolve and carry the bars B, which sustain the buckets, forward, keeping the bars B in a horizontal position and the buckets in a vertical position; and when the crank-arms C, in their revolutions forward, have descended until the lower ends of the buckets A touch the water, the lower ends of the buckets from entering the water until the crank-arms C reach their lowest position, describe a segment of a circle, and from where the crank-arms C leave their lowest position the lower ends of the buckets describe another portion of a circle until the buckets leave the water, each series performing the same motion alternately. When the four bars B of one section are at the same level and on the same horizontal plane as the frame P, all the buckets of that section are out of the water, and the object of having two sections is that one series of buckets, or the parts of the buckets of two series, shall always be in the water.

This propeller can be attached one section on each side of a vessel, or at the stern; but it is more especially adapted to vessels composed of two hulls with a water-way between the hulls.

Paddles having vertical buckets or blades have been made heretofore, and buckets or blades have also been made adjustable to the dip required; but

What I claim as my invention, and desire to secure by Letters Patent, is—

Vertical buckets or blades having projecting lips J on both sides of the buckets, having a slot, N, through the buckets from side to side, by which the buckets can be raised or lowered to the dip required, and a connecting rod or bolt, L, passing through the slot N, to maintain the buckets on the horizontal connecting or carrying bars B, and the bars G, connected to the bottom end of the buckets, on both sides, to keep them apart; also the cross brace-bars F, in combination with crank-arms C, cranks D, connecting-shafts E, and horizontal carrying-bars B, for the purpose as shown and described.

JACOB DAVID.

Witnesses:
S. V. FRENCH,
WM. H. WHITLOCK.